(No Model.) M. V. WONCHER. 2 Sheets—Sheet 1.
CARRIAGE WHEEL.
No. 522,248. Patented July 3, 1894.
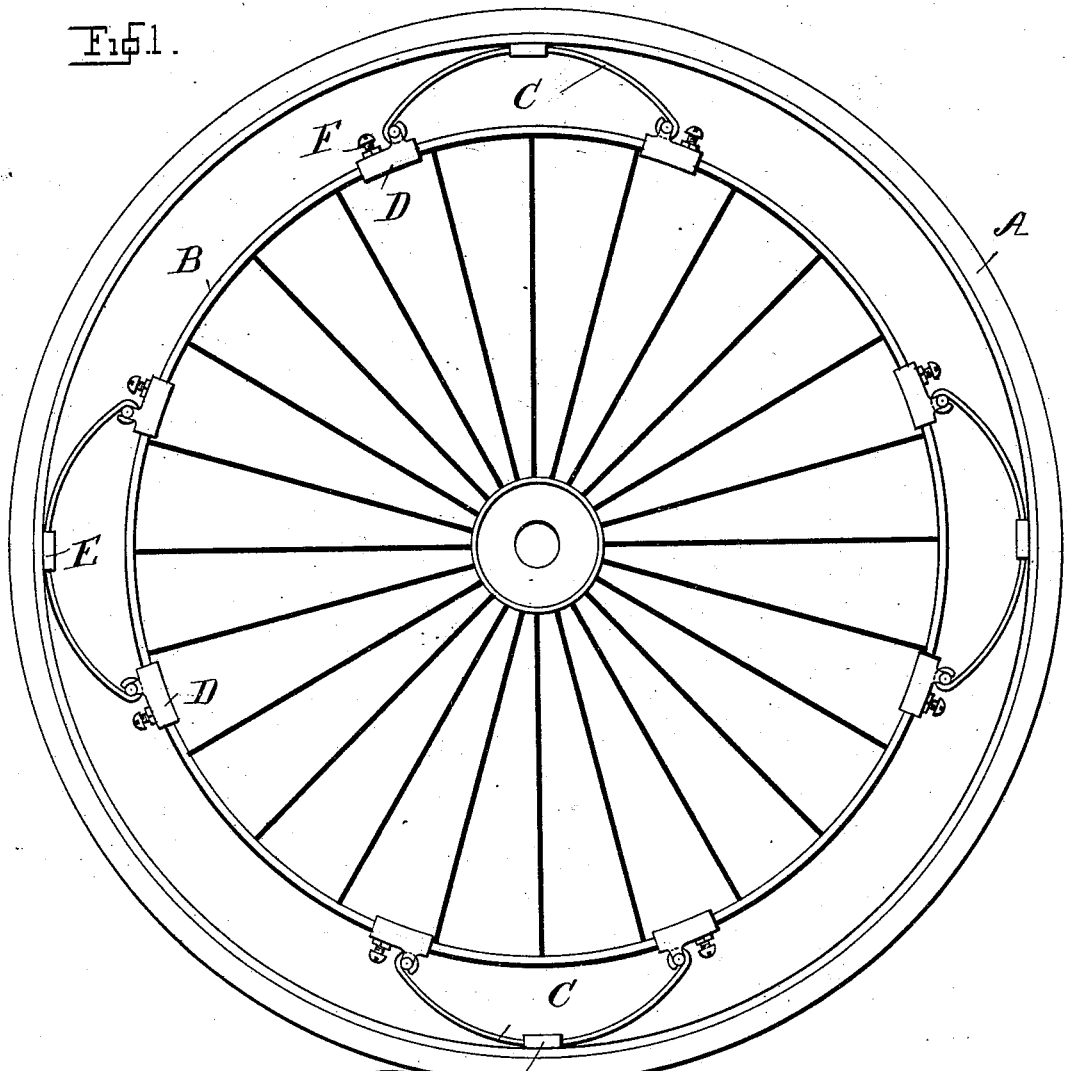
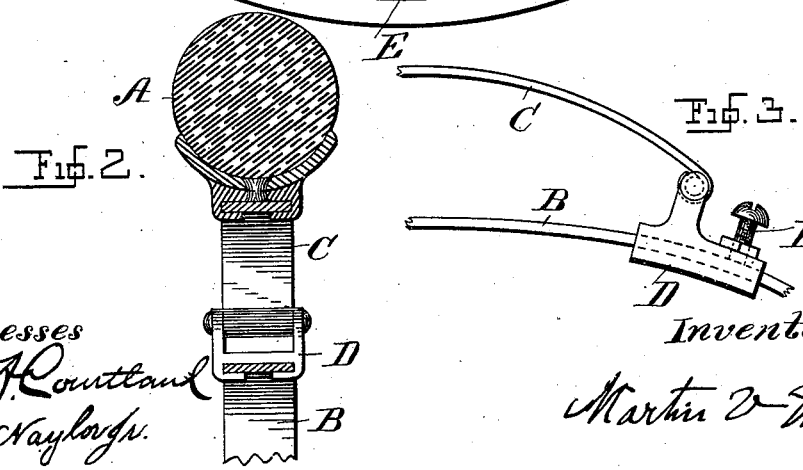
Witnesses
Inventor
Martin V. Woncher (No Model.)

M. V. WONCHER.
CARRIAGE WHEEL.

No. 522,248.

2 Sheets—Sheet 2.

Patented July 3, 1894.

Witnesses
Wm H Courtland
Geo. Naylor

Inventor
Martin V Woncher

UNITED STATES PATENT OFFICE.

MARTIN V. WONCHER, OF BROOKLYN, NEW YORK.

CARRIAGE-WHEEL.

SPECIFICATION forming part of Letters Patent No. 522,248, dated July 3, 1894.

Application filed October 10, 1893. Serial No. 487,742. (No model.)

*To all whom it may concern:*

Be it known that I, MARTIN V. WONCHER, a citizen of the United States, residing in the city of Brooklyn, county of Kings, and State of New York, have invented a new and useful Device for Decreasing the Jarring Effects Due to Percussion in Wheels, of which the following is a specification.

My invention has relation to any kind of wheel, but more especially to bicycle wheels, and the object is to reduce or decrease vibration in the frame and seat of the vehicle so that a person riding over a rough, or uneven surface will not be inconvenienced as is now the case. Another object is to do away with the tires that are liable to puncture.

In the accompanying drawings the same letters of reference indicate the same parts of the invention.

Figure 4:
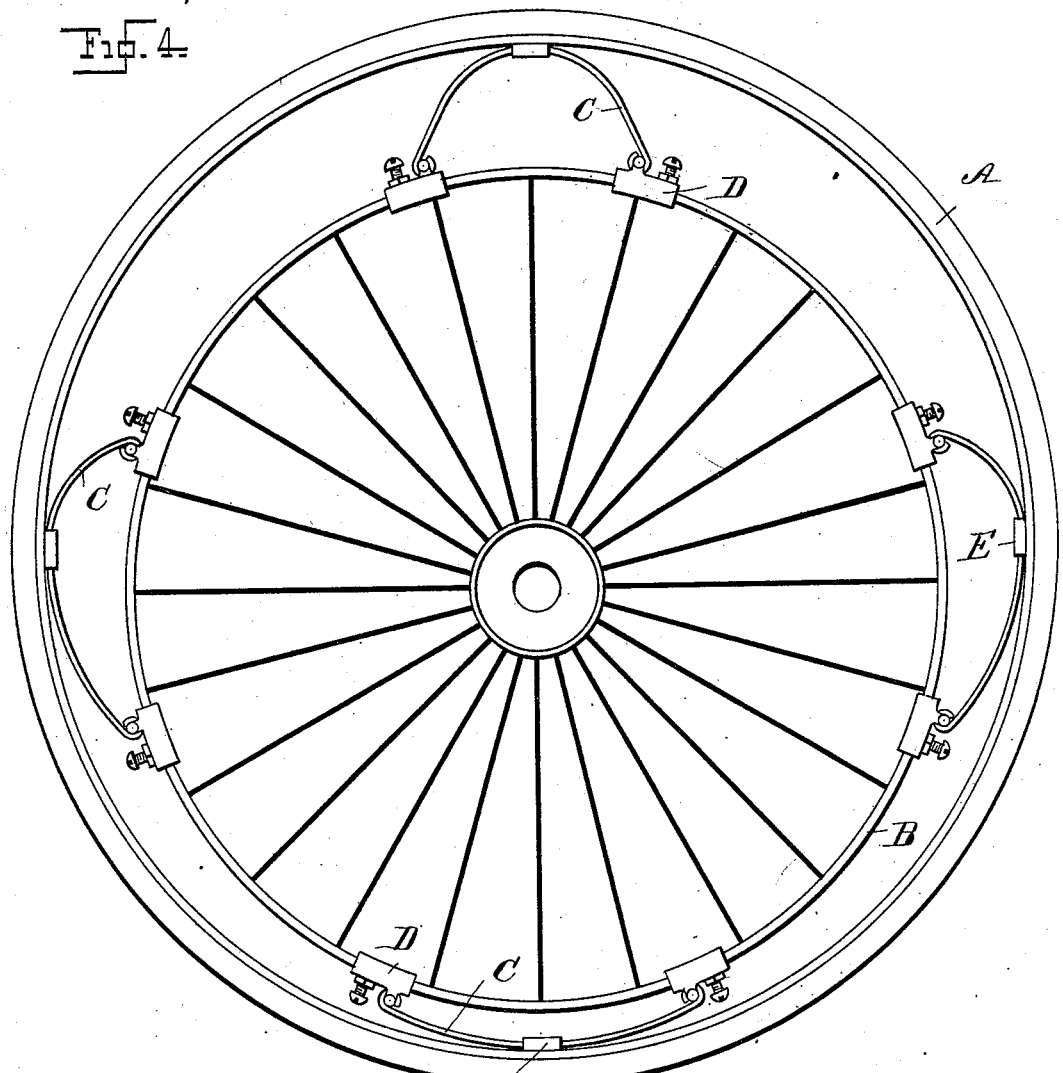
Figure 5:
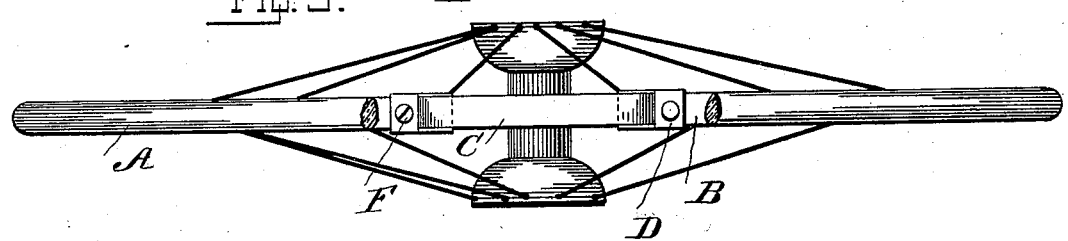

Figure 1, is a side view of the wheel—showing two circles or wheels connected with and by springs. Fig. 2, is a sectional view of the same. Fig. 3, is the sliding support holding one end of a spring, and having a tension screw. Fig. 4, shows the several positions taken by the springs when pressure is put upon the axle of the wheel. Fig. 5 shows the outer rim or wheel partly cut away, and shows one of the springs in position upon the outer periphery of the inner rim or wheel.

Referring to Fig. 1, A. is the outer wheel or rim.

B. is the inner wheel or rim.

C. indicates the springs connecting A and B.

D indicates the slide rests, upon which the springs are attached in a manner to act freely.

E. indicates the clasps having screw holes, said clasps being fixed to the springs at their centers, and held against the inner periphery of the outer wheel or rim by a screw passing through the outer wheel or rim, inward, so that the head of the screw presses against the outer periphery of the outer wheel or rim. This arrangement allows of the springs being taken off, when damaged, by unscrewing the spring and clasp without disturbing the covering of the outer wheel or rim, A.

F. indicates the tension screws in position, the points of which rest upon a friction plate which bears upon the outer periphery of the inner wheel or rim when the screw is turned or forced downward. This arrangement is for the purpose of allowing one style of wheel and mechanism to give the easy riding required. That is to say, a heavy load requires a tighter tension than is used when a light load is being carried.

I am aware that springs have been used previously—for instance—Wolcott's patent, No. 493,419, dated March 14, 1893. I disclaim anything shown by the above mentioned patent, or any other up to the present date, as they are in some way totally different from mine, but What I do claim, and desire to secure Letters Patent for, is—

1. A wheel within a wheel, connected by springs having bearings at their ends and centers, the said centers being fastened rigidly to one rim of the wheel, and the ends resting upon slide rests attached to the other rim, substantially as and for the purposes set forth.

2. A wheel within a wheel, connected by springs having slide rests at their ends substantially as, and for the purposes, set forth.

3. A wheel within a wheel connected by springs, resting upon slide rests having friction plates as described, and tension screws as set forth.

MARTIN V. WONCHER.

Witnesses:
EDWARD S. SPAULDING,
GEORGE W. LYONS.